United States Patent [19]

Ebata

[11] 4,249,418
[45] Feb. 10, 1981

[54] TEMPERATURE DETECTOR USING A SURFACE ACOUSTIC WAVE DEVICE

[75] Inventor: Yasuo Ebata, Yokohama, Japan

[73] Assignee: Tokyo Shibaura Denki Kabushiki Kaisha, Kawasaki, Japan

[21] Appl. No.: 29,530

[22] Filed: Apr. 12, 1979

[30] Foreign Application Priority Data

Apr. 20, 1978 [JP] Japan .................................. 53-46848

[51] Int. Cl.³ ............................................ G01K 11/24
[52] U.S. Cl. .............................. 73/339 A; 310/313 R; 331/107 A
[58] Field of Search .............. 73/339 A, DIG. 4, 597; 331/107 A, 155; 310/313

[56] References Cited

U.S. PATENT DOCUMENTS 3,983,424  9/1976  Parks ..................................... 310/313
4,096,740  6/1978  Sallef ................................ 73/DIG. 4

OTHER PUBLICATIONS

Barrett et al., *Journal of Meterology,* vol. 6, No. 4, Aug. 1949, pp. 273–276.

Reeder, *Proceedings of the IEEE,* vol. 64, No. 5, May 1976, pp. 754–756.

Lewis, Surface Acoustic Wave Devices and Applications, *Ultrasonics,* May 1974, pp. 115–123.

Maines et al., Simple Technique for the Accurate Determination of Delay, *Electronic Letters,* vol. 5, No. 26, Dec. 27, 1969, pp. 678–680.

*Primary Examiner*—Charles A. Ruehl
*Attorney, Agent, or Firm*—Oblon, Fisher, Spivak, McClelland & Maier

[57] ABSTRACT

A transmitting section includes an oscillator which has a surface acoustic wave device of which the frequency characteristic varies responding to the temperature of a base plate thereof, the oscillator generating an oscillation output of a frequency corresponding to the frequency characteristic and an antenna for transmitting the oscillation output. A receiving section includes a receiving antenna, a means for detecting the output of the receiving antenna, and a signal processing circuit for processing the output of the detecting means to generate at least one of the temperature display and control signals of the base plate of the surface acoustic wave device.

6 Claims, 8 Drawing Figures

TEMPERATURE DETECTOR USING A SURFACE ACOUSTIC WAVE DEVICE

The present invention relates to a temperature detector using a surface acoustic wave device of which the frequency characteristic varies responding to the temperature of a component base plate thereof and, more particularly, a temperature detector capable of detecting in a wireless manner the temperature of the base plate composing the surface acoustic wave device at a plate remote from this surface acoustic wave device.

There have been publicly known various temperature detecting means, for example, a means for detecting the change in the resistance value of a thermistor responsible to the change of temperature, a means for detecting the change in the electromotive force of a thermocouple responsible to the change of temperature, a means for detecting the change in the quantity of thermal expansion of a matter itself as in the thermometer, and so on.

A rising demand exists these days to detect by a wireless means the temperature of a matter or in a space located apart from the place where temperature detection is made. None of the above-mentioned means can meet this demand. A first means using the wireless means detects the infrared rays emitted from a matter, for example. However, this first means must be provided with a semiconductor infrared-ray-sensor or a piroelectric device of relatively high cost. In addition, it is necessary in the first means to correct the emissivity of the surface of a matter of which temperature is to be detected. The first means can be therefore employed in particular fields.

A second means using the wireless means is of the type which modulates a carrier wave in the form of AM (amplitude modulation), FM (frequency modulation), or PCM (pulse code modulation) using measured temperature data, and which transmits the modulated wave by means of the wireless means to a place where the temperature detection is to be made. However, because of high cost, this second means can be applied only to a temperature detection system of relatively large scale.

As a third means using the wireless means is the well known means which uses a crystal vibrator. The increasing use of micro-computers these days has caused this third means to be developed for the purpose of obtaining measured temperature data in a digital manner. It is usually required that a crystal vibrator minimize the change in the oscillating frequency thereof due to changes in temperature. However, a vibrator in which the change in the resonant frequency due to changes in temperature is large can be obtained by selectively applying Y-cut or LC-cut to the crystal plate thereof. When the vibrator thus obtained is used to form an oscillator and the oscillating frequency thereof is measured by a counter, the temperature of this vibrator can be detected in a digital manner. This makes it possible to detect temperature with high accuracy and good linearity. However, the third means has the following drawbacks: this vibrator is not suitable for mass production because the vibrators must be formed and trimmed independently from one another; and since the mechanical vibration phenomenon is due to the whole of the vibrator, it is difficult to use the vibrator itself stuck to the inner face of a metal case which has a large heat transfer rate, and therefore it is necessary to support the vibrator by means of a supporting rod arranged inside the metal case, so that the response time during which the vibrating frequency of the vibrator varies due to the change in the atmospheric temperature outside the metal case becomes large because the temperature of air, for example, outside the case must be transfered through the gas or air inside the case to the vibrator.

Accordingly, the object of the present invention is to provide a temperature detector using a surface acoustic wave device suitable for mass production which enables the response time due to the change in atmospheric temperature to be short, the digitization of measured temperatures to be easy, and measured temperatures to be transmitted in wireless manner.

The temperature detector of the present invention includes a surface acoustic wave device and comprises a transmitting section including an oscillator having a surface acoustic wave device of which the frequency characteristic varies corresponding to the temperature of a base plate thereof, the oscillator generating an oscillation output of a frequency corresponding to the frequency characteristic of the surface acoustic wave device and a first antenna coupled to the oscillator for transmitting the oscillation output; and a receiving section including a second antenna for receiving the output of the first antenna, a means for detecting the oscillation frequency of the oscillator from the output of the second antenna and a signal processing circuit for processing the output of the detecting means to generate at least one of a temperature display and control signals of the base plate of the surface acoustic wave device.

This invention can be more fully understood from the following detailed description when taken in conjunction with the accompanying drawings, in which.

Figure 1:
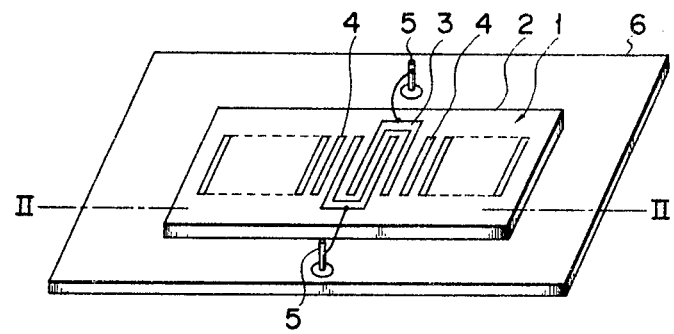
FIG. 1 is a perspective view showing an example of the surface acoustic wave resonator employed in the temperature detector of the present invention.

In FIG. 1 a surface accoustic wave resonator 1 includes a Y-cut and Z-propagation base plate (piezoelectric base plate) 2 of lithium niobate, an interdigital transducer 3 arranged in the center and on the surface of this base plate 2, about 200 pieces of reflecting strips 4 arranged at the both sides of the transducer 3, and terminals 5 respectively connected to a pair of electrodes forming the transducer 3. The electrodes of the transducer 3 and the reflecting strips 4 are formed by vapor-depositing a thin film of aluminium on the surface of the base plate 2 and then applying photo-etching thereto.

The film thickness of aluminium is 2000 Å, and the line width as well as the space of the electrodes of the transducer 3 and the reflecting strips 4 are about 12 μm, respectivley. The element 1 can be formed about 50 units on a base plate of which diameter is about 5 cm by means of the usual IC (integrated circuit) forming process. These 50 units of element are separated one from another by cutting. The area of the base plate having one unit element is 1.5 mm×10 mm and the thickness thereof is 0.5 mm.

The above-mentioned surface acoustic wave resonator shows the same resonance characteristics as that of a crystal resonator, and it is taught in the U.S. Pat. No. 3,886,504 (C. S. Hartmann et al) that this surface acoustic wave resonator can be used as a filter or an oscillator component. However, it should be noted that the following large differences exist between the crystal resonator and the surface acoustic wave resonator: in the case of the crystal resonator the whole plate of the resonator vibrates mechanically while in the case of the surface acoustic wave resonator the mechanical vibration is generated and propagated centering on a portion extremely adjacent to the surface of the base plate; the oscillation frequency characteristics has no relation to the shape of the base plate; and it is the shape and arrangement of the electrodes of the transducer 3 and the reflecting strips 4 that determine the frequency characteristics, particularly the resonance frequencies are determined mainly by the width as well as the spacing of the electrodes of the transducer and the reflecting strips 4. For these reasons, the surface acoustic wave device having resonace frequencies in a band higher than 30 MHz, that is, in the VHF or UHF band can be easily produced in mass production scale.

The shape of the base plate can be quite freely selected as described above, so that the thickness of the base plate can be made thin. In addition, since the shape of the back face of the base plate can also be freely selected, the base plate is suitable for forming a temperature sensor of which the response time due to the change in atmospheric temperature is short by sticking the base plate directly to a metal plate having a large heat transfer rate.

The Y-cut and Z-propagation piezoelectric base plate of lithium niobate has the following advantages: The changing rate of frequency characteristic thereof corresponding to a temperature of the base plate is large: The Y-cut angle deviation ranging ±5° and the Z-propagation direction angle deviation ranging ±0.5° cause the deviation of surface acoustic wave speed to be only the range of ±0.3 m/s. This deviation of ±0.3 m/s corresponds to a temperature change of ±1° C. of the base plate. This means that the above-mentioned deviations do not prevent the mass production of the surface acoustic wave devices, that characteristic deviations among the surface acoustic wave devices are substantially small and that the acoustic wave devices thus produced are suitable for temperature sensors.

Figure 2:
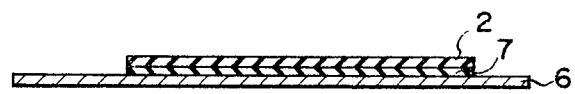
FIG. 2 is a cross-sectional view taken along the line II—II in FIG. 1.

Referring to FIG. 1, the element 1 is stuck onto an iron plate 6 which is 0.4 mm thick and 12 mm×15 mm wide, for example, through a flexible adhesive layer 7 such as epoxy resin, as shown in FIG. 2. A cover (not shown) is attached onto this iron plate. The terminals 5 are attached to the iron plate 6 through insulating members. This construction prevents the resonance frequency of the element 1 from being changed due to the distortion of the base plate 2 of the element 1 which is caused by the distortion of the iron plate 6 due to thermal expansion or other reasons, as the distortion of the plate 6 is absorbed by the flexible adhesive layer 7.

Figure 3:
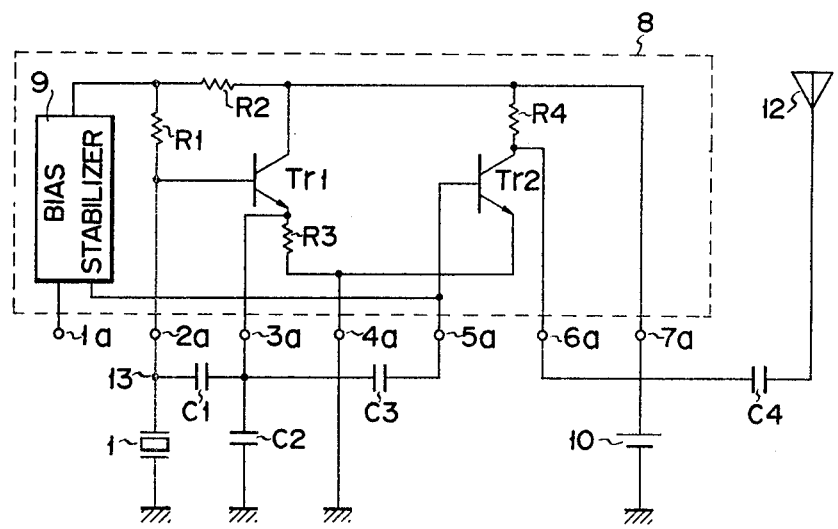
FIG. 3 is a circuit diagram showing an example of the transmitting section of the temperature detector according to the present invention and including the surface acoustic wave resonator shown in FIG. 1.

In a transmitting section shown in FIG. 3, numeral 8 represents TOSHIBA's linear IC TA-7131p, which has external connection terminals $1a$–$7a$ and includes a bias stabilizer 9, resistors R1–R4, and transistors $Tr_1$ and $Tr_2$. The negative pole of a power source 10 (battery, 1.5 V) is earthed and the positive pole thereof is connected through the terminal $7a$ and the resistor R4 to the collector of the transistor $Tr_2$, directly to the collector of the transistor $Tr_1$, through the resistor R2 to the input terminal of the stabilizer, and through the resistors R2 and R1 to the base of the transistor $Tr_1$, respectively. The emitters of transistors $Tr_1$ and $Tr_2$ are connected to each other through the resistor R3 and an output of the stabilizer 9 is supplied to the base of the transistor $Tr_2$. The terminals $2a$–$6a$ are connected to the base of the transistor $Tr_1$, the emitter of the transistor $Tr_1$, the emitter of the transistor $Tr_2$, the base of the transistor $Tr_2$, and the collector of the transistor $Tr_2$, respectively. One terminal 5 of the surface acoustic wave device 1 is earthed and the other terminal 5 thereof is connected to the terminal $2a$, and to the terminal $3a$ through a capacitor $C_1$. One end of a capacitor $C_2$ is earthed and the other end thereof is connected to the terminal $3a$, and to the terminal $5a$ through a capacitor $C_3$. The terminal $4a$ is earthed. The terminal $6a$ is connected to a receiving antenna 12 (which may be an ordinary conductor) through a capacitor $C_4$. In this embodiment, the element 1 is designed to have a resonance frequency of 74.80 MHz at 25° C.

Figure 4A:
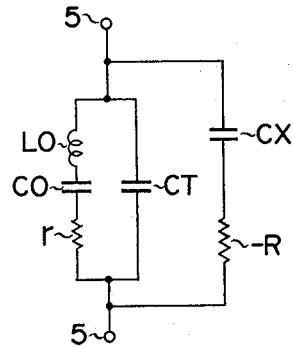
FIG. 4A is an equivalent circuit of the circuit shown in FIG. 3.
Figure 4B:
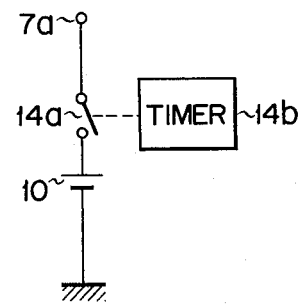
FIG. 4B is a view partly showing a modification of the circuit shown in FIG. 3.

FIG. 4A shows an equivalent circuit of the oscillating portion included in the circuit shown in FIG. 3. As shown in FIG. 4A, the electric equivalent circuit of the surface accoustic wave device 1 is represented by a series resonance circuit of r, Co and Lo, and an electrostatic capacitor $C_T$ between the electrodes of the interdigital transducer 3. The series resonance circuit and the capacitor $C_T$ are connected is parallel. The impedance viewed from a point 13 in the direction of the IC circuit 8 is shown by a series circuit including a capacitor Cx and a negative resistance −R. The value of Cx is determined mainly by the values of capacitors $C_1$ and $C_2$ and the characteristics of the transistor $Tr_1$ shown in FIG. 3. When a condition that the negative resistance $|-R|$ is larger than the resistance r is fulfilled, oscillation is maintained. In this embodiment, the oscillation frequency of the oscillator is determined to be 75.00 MHz at 25° C. This oscillation output is amplified by the transistor $Tr_2$ and the amplified power is applied to the antenna 12 to be transmitted. The current values supplied from the power source 10 at the time of oscillation are in the range of about 1 mA to 1.5 mA. Electric power of 75 MHz and about 1 mW is emitted from the antenna 12. In the actual application of this invention, it is desirable to operate the oscillator by way of a battery and to reduce the power consumption thereof. To attain this object, it is desirable to operate the oscillator intermittently for controlling a temperature intermittently as well. For this, as shown in FIG. 4B, the oscillator can be periodically operated by periodically closing a switch $14a$ by the output of a timer $14b$, said switch $14a$ being arranged between a power source 10 and a terminal $7a$.

Figure 6:
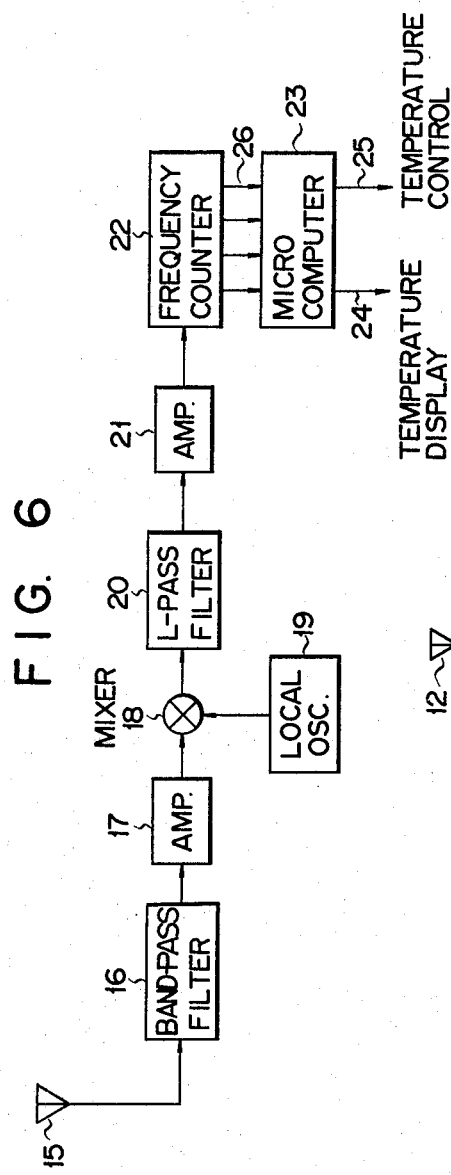
FIG. 6 is a block diagram showing an example of the receiving section of the temperature detector according to the present invention.

A receiving section will be described with reference to FIG. 6. The radio wave emitted from the transmitting antenna 12 is received by a receiving antenna 15. The output (having a frequency of 75 MHz) of the antenna 12 is picked up through a band pass filter 16, which has a center frequency of 75 MHz and a band width of ±2 MHz, and then amplified by a high frequency amplifier (IC TA 7124p for TOSHIBA's television). The outputs from a crystal oscillator 19 of 75.167 MHz and an amplifier 17 are applied to a mixer 18 as inputs and the output of the difference frequency between both inputs is picked up through a low frequency amplifier 20 and then amplified by an amplifier 21. The output frequency of the amplifier 21 is counted by a counter 22. TOSHIBA's digital IC TC 4029p was used as the counter. The output of the counter 22 is subjected to a predetermined data process in a data processor and a temperature display or control signal is picked up from this data processor. FIG. 6 shows a case where the temperature detector of the present invention is employed in an air conditioner which is controlled by a micro-computer 23 and located at the corner of a room. In other words, FIG. 6 shows the case where a signal of 4 bits is applied from the counter 22 to the micro-computer 23 and a temperature display signal 24 (which displays the temperature of the base plate in the surface acoustic wave device located in the center of the room) and a temperature control signal 25 (which controls indirectly the temperature of the base plate 2 in such a way that the temperature of the center of the room becomes equal to a predetermined value) are emitted as outputs. TOSHIBA's 4 bits IC TMP-4315 can be used as the micro-computer.

Figure 5:
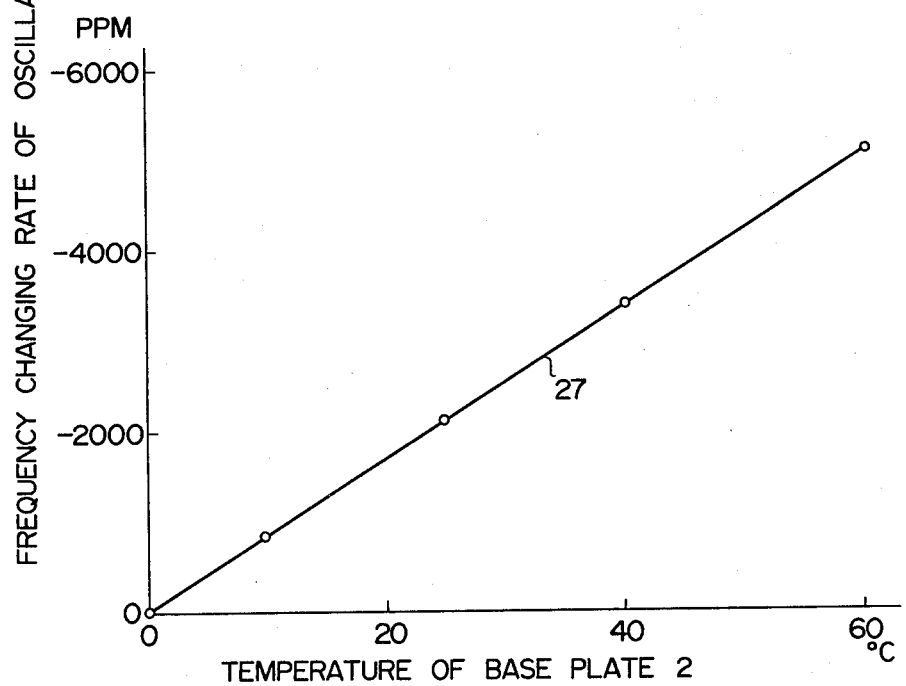
FIG. 5 is a graph showing the relation between the temperatures of the base plate of the surface acoustic wave resonator included in FIG. 3 and the changing rate in the oscillation frequencies of the oscillator shown in FIG. 3.

FIG. 5 shows a characteristic curve 27 which is drawn by plotting the temperatures of the temperature sensor (the temperatures of the base plate of the surface accoustic wave device 1 shown in FIG. 1) on the axis of abscissa and the frequency change rates (PPM) on the axis of ordinate, said frequency change rates being obtained by normalizing the difference frequencies detected by the receiving section (FIG. 6) by 75 MHz. Measurement was made by housing the oscillator in a thermostatic vessel and locating the receiving section 2 m apart from the vessel. The temperature of the temperature sensor was displayed to be 26° C. by the receiving section when about 2 minutes had passed after the temperature sensor was moved from the theremostatic vessel of 35° C. to a place of which room temperature was 25° C. In other words, this shows that measurement accuracy of about 90% was attained after 2 minutes. It has been found that the response time due to the change in temperature meets practical needs.

Figure 7:
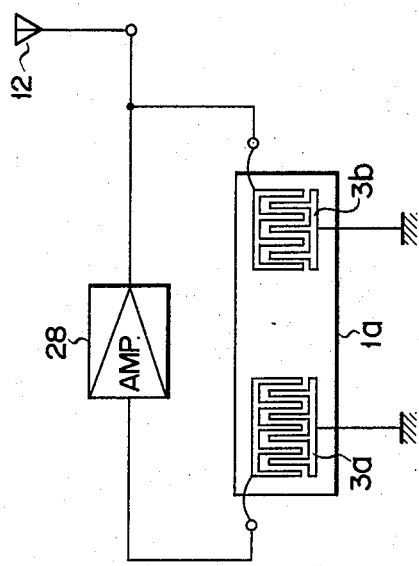
FIG. 7 is a block diagram showing another example of the transmitting section of the temperature detector according to the present invention.

Though the case where the temperature detector of the present invention is applied to the air conditioner has been described above, the temperature at a predetermined portion of a moving or rotating body can be measured by the wireless means at a place spaced apart from the body. The transmitting section of the present invention can be formed by a publicly well known oscillator, in which a loop is formed by a surface acoustic wave delay line and an amplifier, as well as the surface acoustic wave resonator (shown by numeral 1 in FIG. 1). For example, as shown by the principle block diagram in FIG. 7, it may be arranged so that the output of a first inter-digital transducer 3a of the surface acoustic wave delay line is supplied to an amplifier 28 and the output of the amplifier 28 is then supplied to the antenna 12 while being fed back through a second and the first inter-digital transducers 3b and 3a to the amplifier 28, said surface acoustic wave delay line being formed by arranging the first and second inter-digital transducers 3a and 3b at both ends of a base plate 1a.

What is claimed is:

1. A temperature detector using a surface acoustic wave device comprising:

a transmitting section including an oscillator having a surface acoustic wave device of which the frequency characteristic varies responding to the temperature of a base plate thereof, said base plate being attached to a member having good heat conductivity through a flexible adhesive layer, said oscillator generating an oscillating output of a frequency corresponding to said frequency characteristic of said surface acoustic wave device, and a first antenna coupled to said oscillator for transmitting said oscillating output; and a receiving section including a second antenna for receiving the output of said first antenna, a means for detecting the oscillation frequency of said oscillator from the output of said second antenna, and a signal processing circuit for processing the output of said detecting means.

2. A temperature detector using a surface acoustic wave device according to claim 1 wherein said surface acoustic wave device is a surface acoustic wave resonator.

3. A temperature detector using a surface acoustic wave device according to claim 1 wherein said surface acoustic wave device is a surface acoustic wave delay line.

4. A temperature detector using a surface acoustic wave device according to claim 1 wherein said base plate of the surface acoustic wave device is a Y-cut and Z-propagation base plate of lithium niobate.

5. A temperature detector using a surface acoustic wave device according to claim 1 wherein said oscillator is provided with a means which causes said oscillator to be oscillated intermittently.

6. A temperature detector using a surface acoustic wave device according to claim 1 wherein said means for detecting the oscillation frequencies of the oscillator includes a reference frequency oscillator, a mixer for picking up the output of a difference frequency between the output frequency of the second antenna and the reference frequency, and a counter for counting the output frequency of said mixer; and wherein said signal processing circuit is a micro-computer which receives, as an input, the output of said counter and emits an output.

* * * * *